No. 802,832. PATENTED OCT. 24, 1905.
F. ST. THOMAS.
MILK PAIL.
APPLICATION FILED MAY 5, 1905.
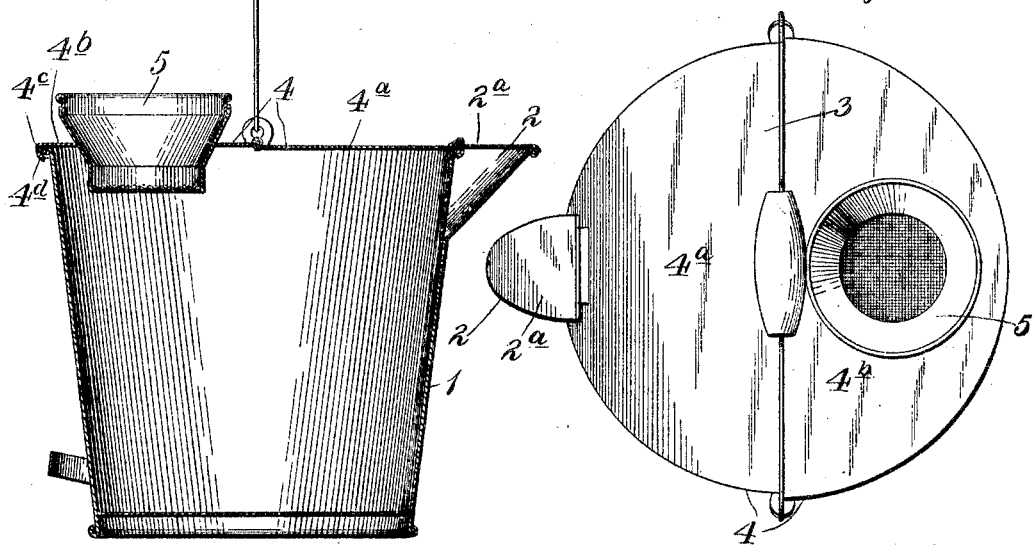
Witnesses:
W. H. Durand.
J. W. Hister.
Inventor:
Frederick St. Thomas,
By Louis Bagger & Co.
Attorneys

UNITED STATES PATENT OFFICE.

FREDERICK ST. THOMAS, OF BIRNAMWOOD, WISCONSIN.

MILK-PAIL.

No. 802,832.	Specification of Letters Patent.	Patented Oct. 24, 1905.

Application filed May 5, 1905. Serial No. 258,963.

*To all whom it may concern:*

Be it known that I, FREDERICK ST. THOMAS, a citizen of the United States, residing at Birnamwood, in the county of Shawano and State of Wisconsin, have invented new and useful Improvements in Milk-Pails, of which the following is a specification.

My invention relates to improvements in what may be termed "milking-pails."

Objects of the invention are to provide for the initial straining of the milk during the milking operation, as well as to subsequently strain the milk; also to provide for the exclusion from the pail of dirt, &c., during such milking operation; also, to effect the more advantageous arrangement or disposition of the parts.

Said invention consists of certain structural features, substantially as hereinafter fully disclosed and specifically pointed out.

In the accompanying drawings, Figure 1 is a perspective view of my invention with the lid or hinged section or member partially raised. Fig. 2 is a vertical section produced through the strainer of the hinged section or lid, as well as through the strainer-spout. Fig. 3 is a plan view of the pail.

In the disclosure of my invention I provide a pail or bucket 1 of the usual form for the purposes of this invention, the same having the pouring-strainer spout 2, preferably covered with a hinged closure or lid $2^a$, and the ordinary bail or handle 3. Said pail or bucket, however, has a divided or bisected top or closure 4, one section $4^a$ thereof being fixed, preferably that next to the pouring side or spout. The other section $4^b$ is flexibly connected or hinged to the first-referred-to section or member $4^a$ at its forward edge and is preferably beaded or thickened along its outer edge, as at $4^c$, where it engages with the top edge of the pail, for obvious reasons, said edge also having about centrally thereof upon its under side a lug or projection $4^d$, adapted to snap by and form an effective connection with the top edge of the pail for the proper retention of said lid-section in closed position.

A funnel or practically conical strainer member 5 having an annular upper edge is soldered or otherwise fixed into the lid or hinged section $4^b$, with its bottom screen portion, also annular in general outline, depending below the lid or hinged section a short distance within the pail. Into this funnel or strainer is directed the milk when performing the milking operation, as will be readily understood, thus effecting the initial straining of the milk as it enters the pail and providing for keeping the lid or hinged section closed at all times, thereby excluding all dirt, hairs, &c., which would otherwise be liable to enter the pail. Also it is noted that by having the lid or hinged section equipped with the strainer or funnel neither the lid is required to be removed nor the strainer or funnel, as in cleaning the pail. No separable parts are needed in effecting the straining operation. Consequently no pan or other part is liable to be displaced or lost, as might result in milking a vicious cow.

All the parts of the pail for milking purposes are preserved intact, either in adjusting the pail for the milking operation or for removing the milk, while the contrivance is simple and quickly gotten ready for use.

Other advantages of my pail will readily disclose themselves in its use.

I claim—

A milking-pail having a two-part cover or top, with one section or member fixed to its upper edge, next to the pouring side and the other member or lid hinged to the aforesaid member and a funnel fixed to said hinged lid or member and its lower end provided with a strainer, said strainer end depending within said pail, a short distance.

In testimony whereof I affix my signature in presence of two subscribing witnesses.

FREDERICK ST. THOMAS.

Witnesses:
GUY VAN DOREN,
TOM F. CONNORS.